(12) United States Patent
Vukicevic

(10) Patent No.: US 11,222,613 B2
(45) Date of Patent: Jan. 11, 2022

(54) SYSTEM AND METHOD FOR OUTPUT DISPLAY GENERATION BASED ON AMBIENT CONDITIONS

(71) Applicant: Meural Inc., New York, NY (US)

(72) Inventor: Vladimir Vukicevic, Roslyn Heights, NY (US)

(73) Assignee: Meural, Inc., New York, NY (US)

( * ) Notice: Subject to any disclaimer, the term of this patent is extended or adjusted under 35 U.S.C. 154(b) by 451 days.

(21) Appl. No.: 14/673,927

(22) Filed: Mar. 31, 2015

(65) Prior Publication Data

US 2015/0279115 A1  Oct. 1, 2015

Related U.S. Application Data

(60) Provisional application No. 61/972,643, filed on Mar. 31, 2014.

(51) Int. Cl.
*H04N 1/00* (2006.01)
*G09G 5/10* (2006.01)
*G06F 3/14* (2006.01)

(52) U.S. Cl.
CPC ............. *G09G 5/10* (2013.01); *G06F 3/14* (2013.01); *H04N 1/00835* (2013.01); *G09G 2320/0626* (2013.01); *G09G 2360/14* (2013.01); *G09G 2360/144* (2013.01); *G09G 2370/022* (2013.01); *G09G 2370/16* (2013.01)

(58) Field of Classification Search
CPC .................. G09G 2360/14; H04N 1/00835
See application file for complete search history.

(56) References Cited

U.S. PATENT DOCUMENTS

| | | | |
|---|---|---|---|
| 4,754,271 A | 6/1988 | Edwards | |
| 5,760,760 A | 6/1998 | Helms | |
| 5,966,698 A | 10/1999 | Giraud | |
| 6,975,308 B1 * | 12/2005 | Bitetto | H04N 1/00294 345/104 |
| 7,117,256 B1 | 10/2006 | Blinn | |

(Continued)

FOREIGN PATENT DOCUMENTS

EP          2237141 A3    10/2013
WO    WO2004015628 A2    2/2004

(Continued)

OTHER PUBLICATIONS

Sony Corporation, PHD-A55, Digital Photo Frame Operating Instructions, 1999.

*Primary Examiner* — Matthew Salvucci
(74) *Attorney, Agent, or Firm* — Woods Rogers PLC; Timothy J. Bechen

(57) ABSTRACT

A system and method provides for generating an output display on a display device based on at least one ambient condition. The method and system includes a display device or a component associated with a display device that provides for detecting an ambient condition using one or more environmental sensors. The method and system includes analyzing the ambient condition to determine ambient condition factors and retrieving visual display content from at least one visual content database using the ambient condition factors. Therein, the method and system provides the visual display content to the display device so the output display compliments the ambient condition.

20 Claims, 6 Drawing Sheets

(56) References Cited

U.S. PATENT DOCUMENTS

| | | |
|---|---|---|
| 7,155,679 B2 | 12/2006 | Bandaru et al. |
| 8,466,951 B2 | 6/2013 | Huang |
| 8,965,460 B1 * | 2/2015 | Rao .................. G06F 3/005 |
| | | 455/566 |
| 2004/0032400 A1 | 2/2004 | Freeman |
| 2007/0081643 A1 | 4/2007 | Divine |
| 2007/0150916 A1 | 6/2007 | Begole |
| 2011/0093100 A1 * | 4/2011 | Ramsay .............. G06F 3/011 |
| | | 700/94 |
| 2011/0295843 A1 | 12/2011 | Ingrassia et al. |
| 2012/0221687 A1 | 8/2012 | Hunter et al. |
| 2012/0262468 A1 | 10/2012 | Ronayne |
| 2013/0006987 A1 | 1/2013 | Stevenne |
| 2014/0081760 A1 * | 3/2014 | Holm .................. G06Q 30/02 |
| | | 705/14.58 |

FOREIGN PATENT DOCUMENTS

| | | |
|---|---|---|
| WO | WO2004057855 A1 | 7/2004 |
| WO | WO2007030627 A2 | 3/2007 |
| WO | WO2008066595 A2 | 6/2008 |
| WO | WO2009126165 A1 | 10/2009 |
| WO | WO2011057041 A1 | 5/2011 |

* cited by examiner

SYSTEM AND METHOD FOR OUTPUT DISPLAY GENERATION BASED ON AMBIENT CONDITIONS

RELATED APPLICATIONS

The present application relates to and claims priority to U.S. Provisional Patent Application Ser. No. 61/972,643 filed Mar. 31, 2014.

COPYRIGHT NOTICE

A portion of the disclosure of this patent document contains material, which is subject to copyright protection. The copyright owner has no objection to the facsimile reproduction by anyone of the patent document or the patent disclosure, as it appears in the Patent and Trademark Office patent files or records, but otherwise reserves all copyright rights whatsoever.

FIELD OF INVENTION

The disclosed technology relates generally to graphical display technology and more specifically to determining environmental factors and generating an output display based on the environmental factors.

BACKGROUND

Existing technology provides for digital picture frames looping electronic images. These digital picture frames include a small microprocessor with limited processing technology and a memory device. The microprocessor includes functionality for advancing and transitioning between images.

Advancements in the digital picture frame technology include improvements in loading images into the local memory. For example, current techniques allow for wireless connectivity, such as a Bluetooth connection, for the uploading of images. In another embodiment, the connectivity may allow for the streaming of content onto the screen using an active network connection.

Where a digital picture frame is a smaller screen, a flat screen television is more commonly available. Flat screen televisions, when idle, can serve as an electronic canvas such as using screensaver technology.

The growth of smart television technology further enhances the ability to stream and provide content to an idle television screen. This technology may be embedded within processing technology of the television itself or can be enhanced or supplemented by a connected device. Where a smart television includes functionality for wireless connectivity to the Internet, this allows for a user to access Internet-based content for display on the screen.

Similarly, connected technology allows for the importation of content for display on the screen. One example is an AppleTV® available from Apple, Inc. of Cupertino Calif. This product connects via a USB connection and receives content via either a local computer or direct connection to the Internet. Via the USB-connected device, the user can load content onto the screen.

Existing technology suffers from a disconnect between environmental factors/conditions and output content. The output on an electronic screen is predicated on the user's select engagement of content. Thus, existing display technology is based on user selection of content.

One form of technology using sensors for display adjustment is a reactive technology for adjusting the quality of content, not the content. Adaptive brightness systems determine the brightness of a particular room and automatically adjust the brightness level of the television display. This adjustment does not relate to type of content, but makes existing content more visible.

With the advancement of smart technology and improved access to content, there exists a need in the art for determining and selecting output content based on environmental conditions instead of requiring user content selection.

BRIEF DESCRIPTION

A system and method provides for generating an output display on a display device based on at least one ambient condition. The method and system includes a display device or a component associated with a display device that provides for detecting an ambient condition using one or more environmental sensors. The method and system includes analyzing the ambient condition to determine ambient condition factors and retrieving visual display content from at least one visual content database using the ambient condition factors. Therein, the method and system provides the visual display content to the display device so the output display complements the ambient condition.

In one embodiment, the content and analysis of the ambient condition factors may be performed in a local processing environment. Similarly, visual content may be locally stored, or a further embodiment allows for the visual content to be stored in a networked environment, for example on a content server accessible via the Internet. This embodiment includes using network communication with the visual content database and downloading the visual display content to a local memory device for providing the visual display content to the output display.

In one embodiment, the environmental sensor includes a light sensor for detecting a brightness level as an ambient condition. Therein, the adjustment of the visual display content reflects the brightness level. For example, a darkly lit room suggests the visual display to be darker-toned images such as an example of a starry night and the example of a bright-lit room suggests a bright visual display such as a beach drenched in sunlight.

In one embodiment, the environmental sensor may be an audio sensor. The audio sensor detects ambient noise, including recognition of types of noises, e.g. a particular song, movie, etc. Another type of ambient noise may be a general recognition of noise level, such that a high noise level can indicate a large number of individuals and output display is adjusted to reflect the congregation of individuals in a social setting. In additional to a visual display, the output may also be an audio output, e.g. a song or other music complimentary to the ambient conditions.

In one embodiment, the environmental sensor may be a motion detector. The motion detector is operative to detect motion relative to the display device. The motion provides for a related commotion level, for example if there is a high degree of commotion this can represent party or gathering of individuals, the method and system in this embodiment retrieving the visual display content based at least in part on the commotion level.

Another embodiment includes the detection of connected devices, e.g. computing devices such as a smartphone by way of example. The number of connected (or connectable) devices can indicate an approximate number of individuals in proximity to the display device. Where granted access, interactivity with the connected devices further allows for access to user-specific content. For example, detecting a user is present based on the connected device may therein allow for access to social media content and based on access privileges of the social media content, such content may then be made available for display on the display device.

In one embodiment, the system includes one or more light sensors for detecting brightness, light sources, and/or light consistency within the environment of the hardware display device. Based on light factors, the system leverages local and/or server-stored software to adjust the brightness, contrast, and other display factors in the entire display section or in multiple sections of the display. These stimuli may also determine whether the display entire display section turns on or off—i.e. whether any content is displayed. Based on light factors, the system leverages local and/or server-stored software to display environmentally relevant content—e.g. a more soothing and calm image if the room is darkened, a more vibrant and action-filled image if the room is bright with multiple light sources, etc.

In one embodiment, the system includes one or more sound sensors/microphones for detecting loudness, sound sources (e.g. human voice vs. speakers), and/or distinct sound content (e.g. particular songs, television shows, mood of the voices, etc.) within the environment of the hardware display device. Based on sound factors, the system leverages local and/or server-stored software to adjust the brightness, contrast, and other display factors in the entire display section or in multiple sections of the display. These stimuli may also determine whether the entire display section turns on or off—i.e. whether any content is displayed. The system may display environmentally relevant content—e.g. a more soothing and calm image if the room is quiet, a more vibrant and action-filled image if the room is full of multiple human voices, a contextually relevant image if a particular song in playing on the stereo, etc.

In one embodiment, the system includes one or more motion sensors for detecting motion, shape, and/or size of objects within the environment of the hardware display device. Based on motion factors, the system leverages local and/or server-stored software to adjust the brightness, contrast, and other display factors in the entire display section or in multiple sections of the display. These stimuli may also determine whether the entire display section turns on or off—i.e. whether any content is displayed. Based on motion factors, the system leverages local and/or server-stored software to display environmentally relevant content—e.g. a more soothing and calm image if the environment has little or no motion, a more vibrant and action-filled image if the room is full of multiple motion sources, etc.

In one embodiment, the system includes one or more heat sensors for detecting heat sources and temperature within the environment of the hardware display device. Based on heat factors, the system leverages local and/or server-stored software to adjust the brightness, contrast, and other display factors in the entire display section or in multiple sections of the display. These stimuli may also determine whether the entire display section turns on or off—i.e. whether any content is displayed. Based on heat factors, the system leverages local and/or server-stored software to display environmentally relevant content—e.g. a more soothing and calm image if the environment is cold, a more vibrant and action-filled image if the room is warm, etc.

In one embodiment, the system includes capability to collect and interpret mood, emotion, sentiment, intent, and other personal characteristics based on the internet-connected applications utilized by the viewer. Based on social factors, the system leverages local and/or server-stored software to adjust the brightness, contrast, and other display factors in the entire display section or in multiple sections of the display. These stimuli may also determine whether the entire display section turns on or off—i.e. whether any content is displayed. The system may also display environmentally relevant content—e.g. a more soothing and calm image if the viewer is expressing anxiety, a more uplifting and positive image if the viewer is expressing sadness, etc.

In one embodiment, the system includes capability to recognize and count the number of connected devices within the environment of the hardware display device. Based on device factors, the system leverages local and/or server-stored software to adjust the brightness, contrast, and other display factors in the entire display section or in multiple sections of the display. These stimuli may also determine whether the entire display section turns on or off—i.e. whether any content is displayed. The system may also display environmentally relevant content—e.g. a more soothing and calm image if only one device is present within the environment, a more vibrant and action-filled image if the room contains multiple devices, etc.

The system and method creates a new platform for presenting images, videos, etc. based on external stimuli. It converts local physical and digital information in order to present a better device for artistic, decorative, informational, and other important purposes. It combines both hardware and software in order to create an integrated and seamless experience.

A better understanding of the disclosed technology will be obtained from the following detailed description of the preferred embodiments taken in conjunction with the drawings and the attached claims.

DETAILED DESCRIPTION

Embodiments of the disclosed technology provide for detecting ambient conditions relative to a display device, determining an output complementary to the ambient conditions and generating an output on the display device based thereon.

Figure 1:
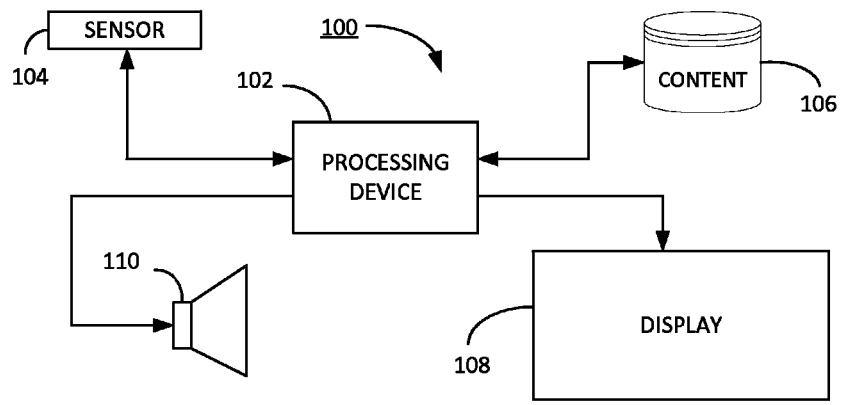
FIG. 1 illustrates a block diagram of a processing system including a display device for generating a display based on ambient conditions.

FIG. 1 illustrates a system 100 including a processing device 102, an environmental sensor 104, database 106, a display 108 and a speaker 110. It is recognized by one skilled in the art, numerous elements known in the art have been omitted for clarity purposes only, for example a power source or connectivity components.

In this embodiment of the system 100, the processing device 102 may be any suitable type of processing device operative to perform processing operations, such as in response to executable instructions. The executable instructions may be stored on a computer readable medium, not expressly illustrated herein. The processing device may be a stand-alone processing component, or operations may be performed in a distributed processing environment. The illustrated processing device 102 represents one or more physical components for performing processing operations as described herein.

The sensor 104 may be any suitable type of sensor allowing for detecting of ambient conditions. As described in further detail below, different sensors provide for detection of different ambient conditions. For example, the environmental sensor may include, but is not limited to, a camera, a motion detector, a light detector, an audio detector and/or microphone, a heat sensor, a wireless signal detector, a Bluetooth signal detector, an electric field sensor for proximity detection and/or gesture-based control, an infrared-based sensor for ambient light detection and/or proximity detection and/or gesture-based control, an ultrasonic transducer sensor for proximity detection and/or gesture-based control, geospatial and/or global positioning sensor, The database 106 may be any suitable memory storage device or devices capable of storing content therein. Illustrated in FIG. 1, the database 106 is directly connected to the processing device 102, such as being embedded or mounted in a processing system. Such illustration is not expressly limiting as the database 106 may be connected via alternative means, such as via a wired or wireless connection, such as a memory device connected via a portal or peripheral connection outlet, a local data storage device accessible via wired or wireless connectivity, or in another embodiment a storage device associated with or internal to another processing device, e.g. smart phone, tablet computer, laptop computer, capable of communication with the processing device 102. For example, the storage 106 may include content such as images, audio files, movies files, etc., stored on a person's mobile device such that the processing device can access and retrieve the content therefrom.

The display device 108 may be any suitable display device, including but not limited to a flat screen television or display consistent with known display technology. The display device 108 may also be a smaller picture frame, such as an electronic picture frame, having the processing device 102 associated therewith.

The speaker 110 may be any suitable speaker and or audio output system recognized by one skilled in the art. The speaker 110 may be part of an audio system or can be an embedded speaker associated with the display 108.

In one embodiment, as described in further detail below, the system 100 may include a central housing having the various elements disposed therein. In further embodiments, different components including the sensor 104, database 106, processor 102, speaker 110 and/or display 108 may be external to the system 100 and engaged via a wired or wireless connection. For example, the functionality of the processing device 102 may be disposed in a remote processor with output functionality to the display 108 via a wireless peripheral-connection device.

In the system 100, the sensor 104 operates to detect ambient conditions. Ambient conditions generally relate to conditions of the environment relative to the sensor and/or display 108. Ambient conditions can include any relevant conditions that can be measured by one or more sensors. For example, an ambient condition may be the number of people within a room and the activity level of those people. This can be determined using a camera or a camera in combination with a motion detector. This can also be determined using a microphone or other audio detection device to determine a number of different voices.

Based on the detection of ambient conditions, the processing device 102 therein performs processing operations to determine ambient condition factors. These ambient condition factors represent estimations of activities or conditions relative to the display 108.

Environmental sensor(s) 104 provide inputs for determining ambient factors based on detecting ambient conditions. Examples of ambient condition factors include but are not limited to quantity of viewers, identity of viewers, viewer proximity, viewer motion, viewer gesture, viewer mood, human sounds, ambient sounds, musical sounds, light quantity, light source, light direction, local temperature, geographic location, etc.

Each ambient condition factor can be informed by one or more of the above specified sensors detecting ambient conditions. The determination of an ambient condition factor can be based on the analysis of the ambient condition.

For example, an ambient condition factor may possess a range of output values that determine the definition of ambient conditions. An example value range for the quantity of viewers may include '1', '2', '3', '4', '5', '6', '7', '8', and '9-or-more' output values. An example value range for the identity of viewers may include 'owner #1', 'owner #2', 'owner #3', 'owner #4', 'owner #5', 'owner #6', 'owner #n+#n', 'multiple owners', 'guest #1', 'guest #2', 'multiple guests', and 'owners+guests' output values. An example value range for the viewer motion ambient factor may include 'none', 'light', 'medium', and 'heavy motion' output values. An example value range for the light quantity ambient factor may include 'none', 'very low', 'low', 'medium', 'high', and 'very high' output values. An example value range for the musical sounds may include 'none', and 'unknown', 'recognized song match' output values. There are numerous other potential ambient conditions and associated ambient condition factor value ranges informed by the various embodiments and combinations of environmental sensors 104.

Based on these ambient condition factors, the processing device therein estimates an ambient condition. Each ambient condition may be informed by one or more ambient factor value ranges. An example of ambient condition 'owner default interacting' would be informed by ambient factors 'quantity of viewers', 'identity of viewers', 'viewer proximity', 'viewer gesture', and potentially more ambient factors. An example of ambient condition 'mixed default party active' would be informed by ambient factors 'quantity of viewers', 'identity of viewers', 'viewer proximity', 'viewer motion', 'viewer gesture', and potentially more ambient factors. An example of ambient condition 'owner mood positive' would be informed by ambient factors 'quantity of viewers', 'identity of viewers', 'viewer proximity', 'viewer gesture', 'viewer mood', and potentially more ambient factors. An example of ambient condition 'two owners recognized song' would be informed by ambient factors 'quantity of viewers', 'identity of viewers', 'viewer proximity', 'viewer gesture', 'musical sounds', and potentially more ambient factors. An example of ambient condition 'mixed owner winter night in New York' would be informed by ambient factors 'quantity of viewers', 'identity of viewers', 'viewer proximity', 'viewer gesture', 'light quantity', 'light source', 'local temperature', 'geographic location' and potentially more ambient factors. There are numerous other potential ambient conditions informed by associated ambient factors informed by the various embodiments and combinations of sensors 104.

In the above example, the large number of individuals in the room and the high ambient noise allows for the processing device to estimate that there is a social gathering in the room, e.g. mixed default party active. Therefore, the processing device, via its operating routine, retrieves video display content consistent with the estimated ambient condition, which in this case may be a selection of images stored in the database 106. In one embodiment, a user may preload images within the database 106 including tags or other identifiers usable for selection based on determined ambient conditions.

It is noted, further exemplary embodiments are described herein, including further embodiments with sensors 104 and ambient conditions.

Figure 2:
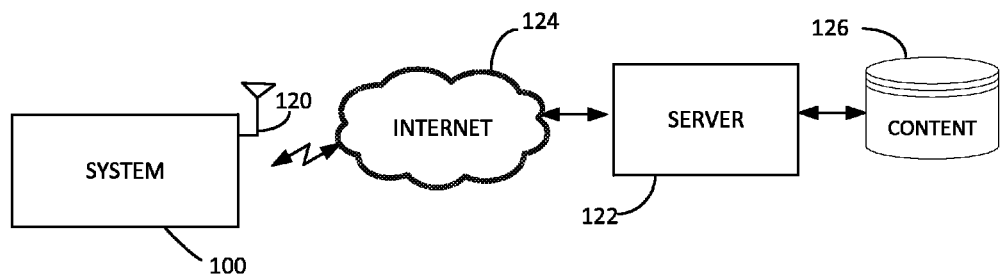
FIG. 2 illustrates a block diagram of a processing system of FIG. 1 in networked communication.

Whereas FIG. 1 illustrates an inclusive system 100, FIG. 2 illustrates the system 100 having networked connection. In FIG. 2, the system 100 includes a wireless transmitter 120 for communication with a server 122 via a networked connection 124, such as the Internet. The server 122 is connected to a network database 126.

The connectivity of FIG. 2 is illustrated as wireless via transmitter/receiver 120, but it is recognized that wired connectivity to a router is within the scope of the system and method. Furthermore, the connectivity of FIG. 2 is not expressly restricted to a direct connection from the system 100, as routing of Internet-based connectivity may be between a local wireless router, a base station, a private network or any other suitable means.

The server 122 may be any suitable network-based processing system accessible via a networked connection. Such connectivity may include login or authentication operations, consistent with techniques recognized by those skilled in the art. The server 122 may include functionality described above regarding processing device 102, such that the processing operations are offloaded to a processor associated with the server 122. The server 122 may include one or more processing devices in a centralized or distributed processing environment.

The database 126 may be one or more data storage devices accessible via the networked connection. The database 126 may include data storage associated with a particular user, or in another embodiment may be a generalized content database or databases. Whereas in FIG. 1 the content for output via the display 108 and/or speaker 110 is retrieved from the local storage 106, the network storage 126 may include a larger library of content. Such content may be user-specific or may be sponsored or directed content. For example, if the ambient conditions indicate a social gathering, the display content may include advertisements for an upcoming festival, concert, event, etc.

The content may also be from public sources, such as content retrieved via tags or metadata associated with the content. For example, the content may be images retrieved from a photo-sharing website or network, audio may be retrieved from a streaming audio service.

FIG. 2 illustrates the embodiment wherein the display system 100 utilizes network interactivity to expand on the content selected and available for display on the display 108 of FIG. 1.

Figure 3:
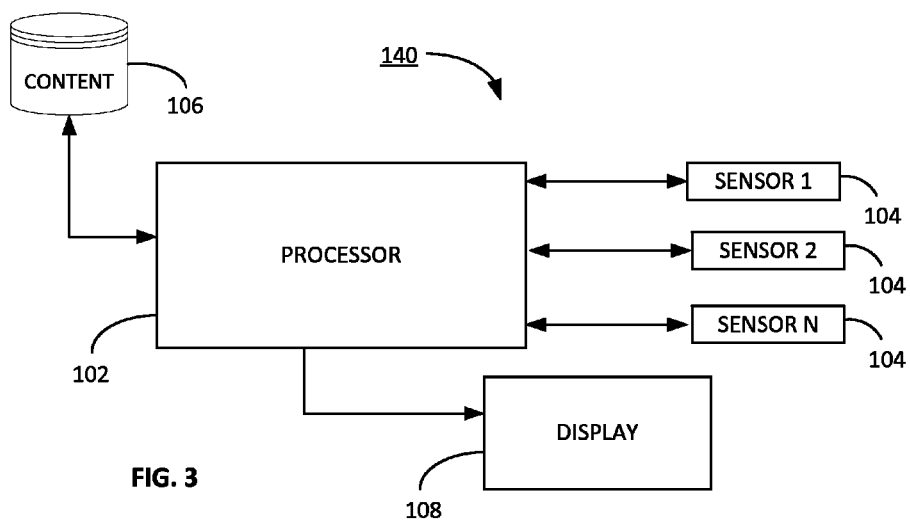
FIG. 3 illustrates a block diagram of one embodiment of a display device processing system.

Whereas the system 100 of FIG. 1 illustrates one sensor 104, FIG. 3 illustrates another embodiment having N number of sensors, where N is an integer value. The system 140 of FIG. 3 includes the processor 102, database 106, display 108, speaker 110 and sensors 142, 144 and 146.

As noted above, the sensor 142, 144 and/or 146 may be any suitable sensor usable to detect ambient conditions. The processor 102, having multiple sensors 142-146 further operates to compile the sensor data to enhance the accuracy of the ambient condition detection. In the above example, the sensor 142 may be a camera detecting five separate individuals in the room and sensor 144 may be a microphone to detect the volume level. Sensor 146 may be a wireless sensor to detect a number of connected devices and determine identity information of people in the room based on the connected device.

In this exemplary embodiment, the connected device may be a smartphone having a social networking application accessible via the smartphone. The sensor 146 may detect the presence of the smartphone based on the smartphone generating a Bluetooth signal or the device seeking wireless connectivity with a local wireless router. Based on proper permissions, the sensor 146 may therein determine the user's identity on a social networking site and access information may available on the social network site. One example may be accessing photos or status updates the user has shared on the site. Another example may be detecting a mood of the user based on any recent posts, including these as ambient conditions.

Figure 4:
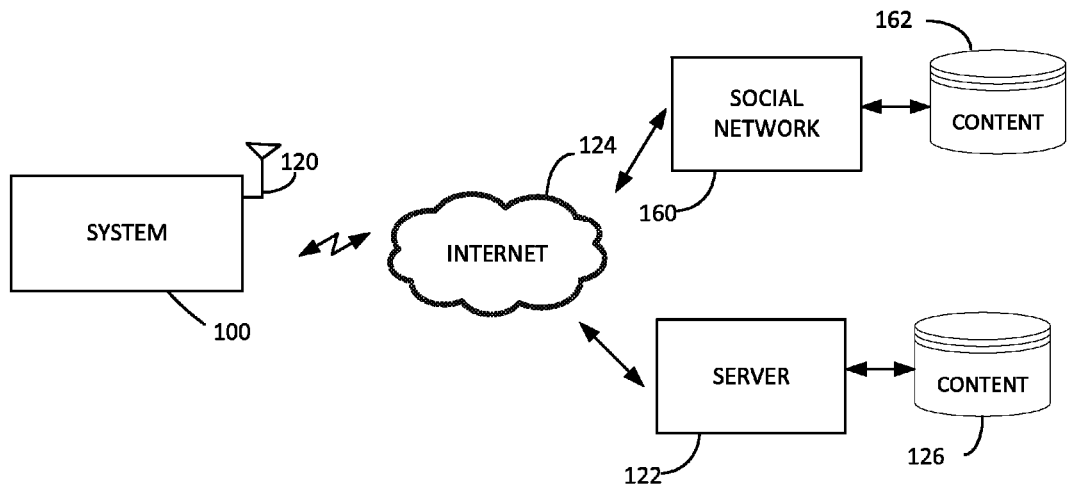
FIG. 4 illustrates another embodiment of a processing system in networked communication.

FIG. 4 illustrates one embodiment of a system for accessing content via a social network. In addition to the system 100 accessing the content server 122 and content database 126 via network 124, FIG. 4 includes a social network 160 having a content database 162 associated therewith.

The social network 160 may be any suitable web-based social networking or content distribution system. The network 160 may include social websites where users post images and/or status updates in a news feed, may include a system where users distribute short messages, may include a system where users submit and distribute images only, where users distribute blogs or other content, by way of example. The network 160 includes a database 162 having content associated therewith, typically associated with a user or tagged content. For example, where a user has a profile on a network site, the database 162 includes the content associated with the profile.

Where permission for content is made available from a user or based on permission levels, the system 100 may therein access and retrieve content for display. In another embodiment, the system 100 having knowledge of a user based on one or more sensors, may use the social network content as another form of to determine ambient condition factors. For example, if a camera as a sensor employs facial recognition and recognizes a user, such as the owner of the system 100, and includes permissions for accessing a social network, the processing device 102 may acquire status information as an ambient condition factor. For example, if the user updates a status to indicate as being recently engaged, this can be an ambient condition whereby the visual display content may include content relating to wedding interests.

Figure 5:
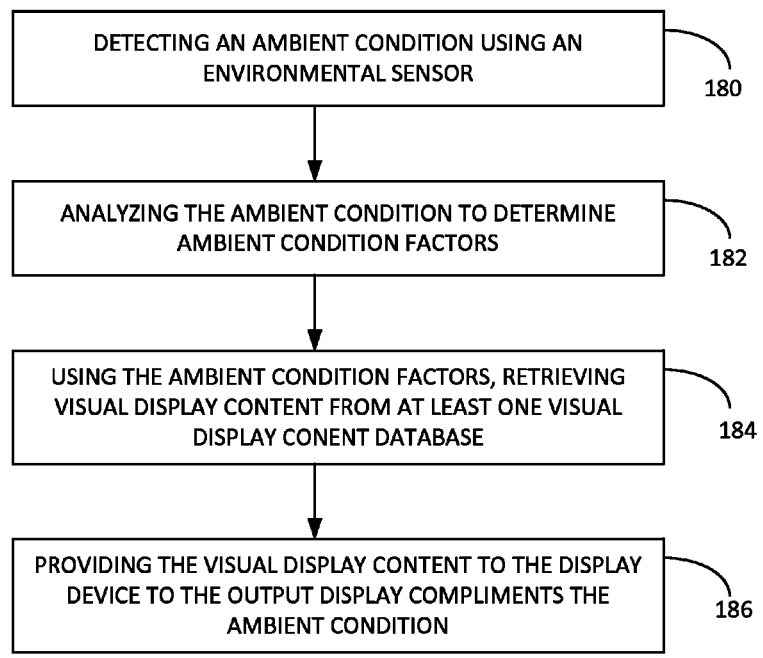
FIG. 5 illustrates a flowchart of the steps of one embodiment of a method for generating an output display on a display device based on at least one ambient condition.

The processing 102 of the system 100 including functionality performed by one or more processing devices. FIG. 5 illustrates the steps of one embodiment of the methodology, as performed by the physical electronic processing devices of FIGS. 1-4.

In the method, a first step, step 180, is detecting an ambient condition using an environmental sensor. This may include sensors 104 as described above. Similarly, the environmental sensor may include processing operations performed by the processor 102 in acquiring information via available sources, such as the networked communication of FIG. 4.

A next step, step 182, is analyzing the ambient condition factors to determine ambient condition. Examples of ambient factors include but are not limited to quantity of viewers, identity of viewers, viewer proximity, viewer motion, viewer gesture, viewer mood, human sounds, ambient sounds, musical sounds, light quantity, light source, light direction, local temperature, geographic location, etc. Each ambient factor can be informed by one or more of the above specified sensors. Based on these ambient condition factors, the processing device therein estimates an ambient condition. Each ambient condition may be informed by one or more ambient factor value ranges.

Step 184 is, using the ambient condition factors, retrieving visual display content from at least one visual content database. As described above, the visual content database may be a local database 106 or can be a network-accessible database 126. The content can be images, videos, advertisements, text, audio or any other suitable content. Content is either automatically or manually tagged with appropriate ambient condition tags. Content is selected for display based on the matching of ambient condition tags with the determined ambient condition.

Step 186 is providing the visual display content to the display device so that the output display compliments the ambient condition. For example, with reference to FIG. 1, the output is displayed on the display 108, which may include audio via the speaker 110. If the ambient conditions detect a single person in the room, the room being dark and no or little movement, the output display may be soothing image with soft music associated with the image, as an example.

Figure 6:
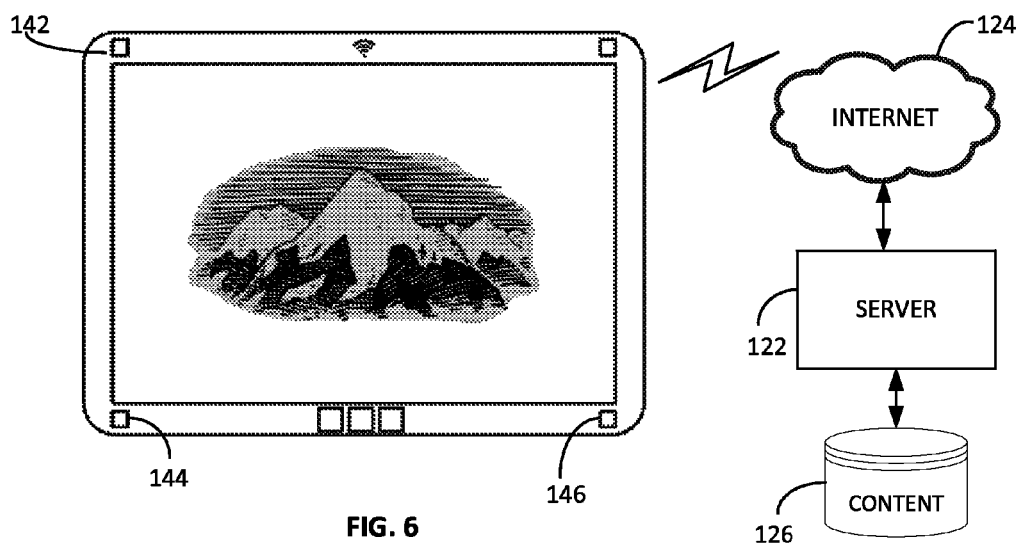
FIGS. 6-9 illustrate representative displays of various embodiments of a display device providing an output based on at least one ambient condition.

FIG. 6 illustrates a graphical display of a display device including multiple sensors, such as noted sensors 142, 144 and 146. Further sensors are within the scope of the display device. The device further includes a wireless connector for connecting to the server 122 via the Internet 124. In this embodiment, the server 122 performs processing operations for determining content from database 126 based on the sensor 142, 144 and/or 146 input. In this embodiment, the sensors may detect little movement, thus proposing a soothing image of a mountain scene.

Another embodiment is using a light sensor, such as detecting brightness, light sources, and/or light consistency from stimuli within the environment of the hardware. Based on light factors, the system leverages local and/or server-stored software to adjust the brightness, contrast, and other display factors in the entire display.

Another embodiment of the sensor data relates to motion detection for detecting motion, shape, and/or size of objects within the environment. Based on motion factors, the system leverages local and/or server-stored software to display environmentally relevant content, e.g. a more soothing and calm image if the environment has little or no motion, a more vibrant and action-filled image if the room is full of multiple motion sources, etc.

Figure 7:
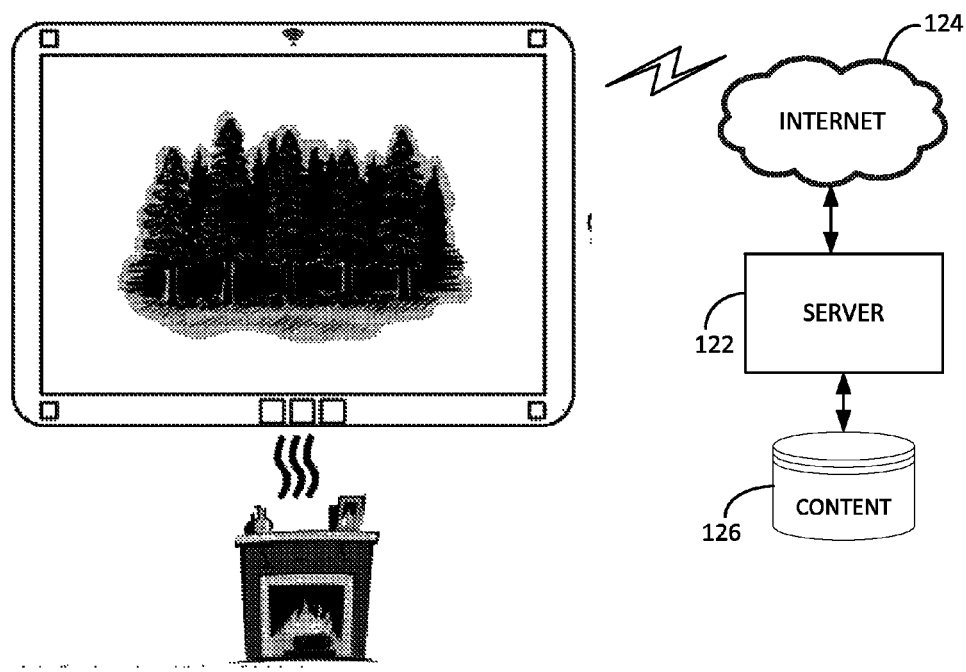

FIG. 7 is a visual representation of the intelligent system for displaying digital visual content responding to heat-based environmental stimuli. In this scenario, the system includes one or more heat sensors for detecting heat sources and temperature within the environment of the hardware. Based on heat factors, the system leverages local and/or server-stored software to adjust the brightness, contrast, and other display factors in the entire display.

Figure 8:
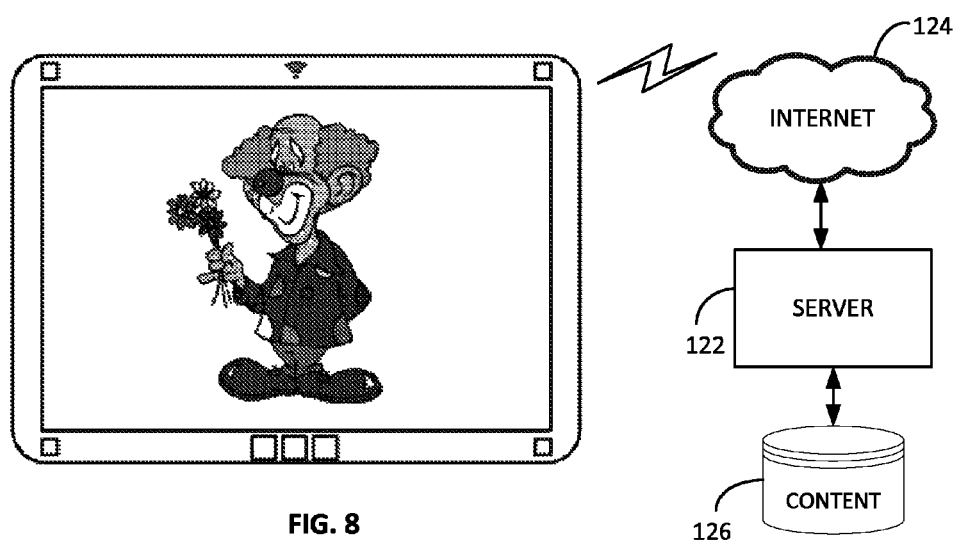

FIG. 8 is a visual representation of the intelligent system for displaying digital visual content responding to mood-based environmental stimuli—i.e. the digital footprint associated with viewer. In this scenario, the system includes capability to collect and interpret mood, emotion, sentiment, intent, and other personal characteristics based on the internet-connected applications utilized by the viewer—e.g. social media software as described above.

Based on social factors, the system leverages local and/or server-stored software to adjust the brightness, contrast, and other display factors in the entire display. The system is further operative to, based on social factors, the leverage local and/or server-stored software to display environmentally relevant content—e.g. a more soothing and calm image if the viewer is expressing anxiety, a more uplifting and positive image if the viewer is expressing sadness, etc. Similarly, the system may acquire content for display based on the social media content available.

Figure 9:
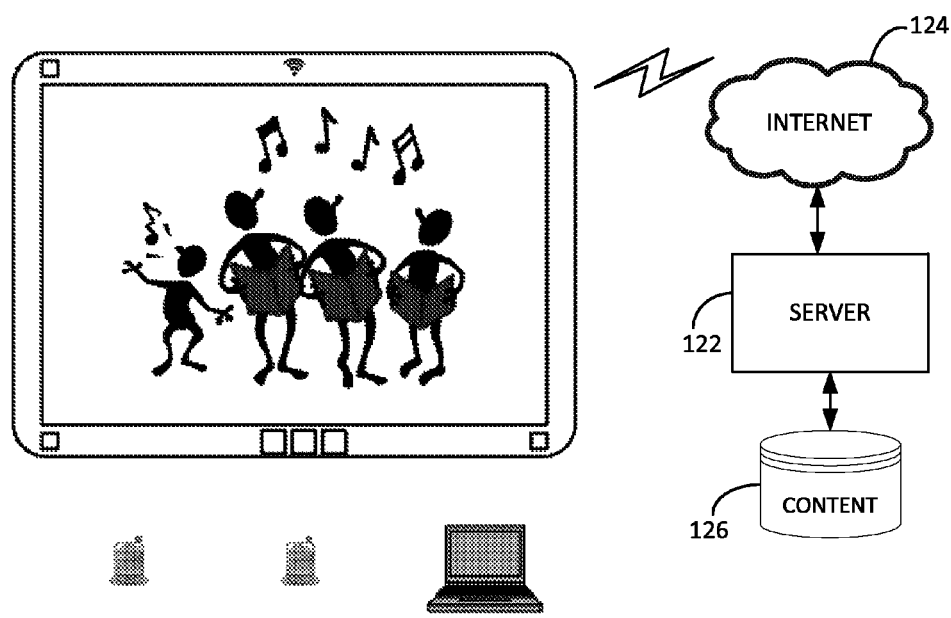

FIG. 9 is a visual representation of the intelligent system for displaying digital visual content responding to multiple devices—i.e. internet-connected stimuli. In this scenario, the system includes capability to recognize and count the number of connected devices within the environment. Based on these devices, the system can determine environmental conditions, such as the number of individuals in the environment, the mood of the users such as via social media, or other factors usable for selecting content.

Figure 10:
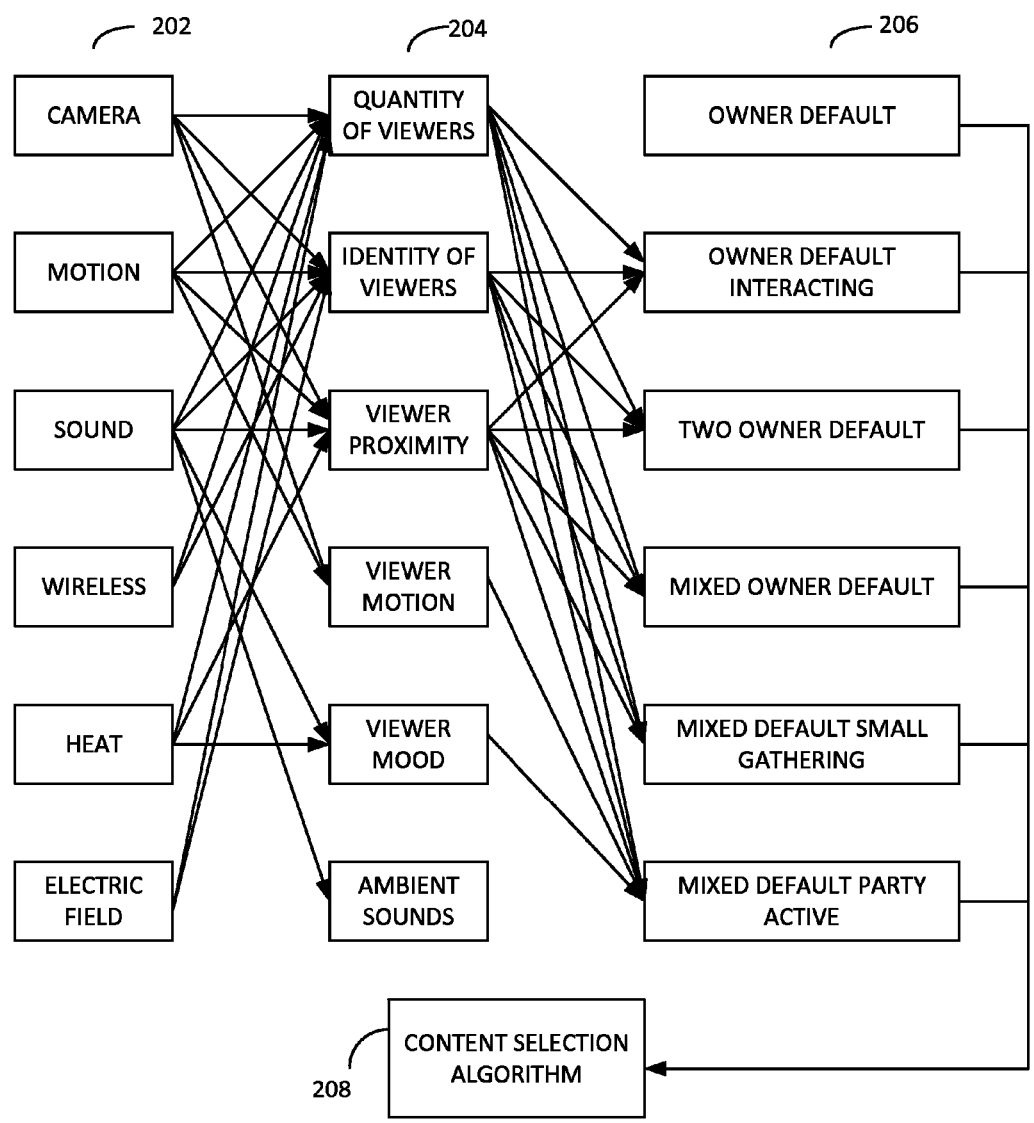
FIG. 10 illustrates a data flow diagram of determining ambient condition factors.

FIG. 10 is a data flow diagram illustrating multiple embodiments of the visual display content selection based on ambient condition factors determined by ambient conditions detected by environmental sensors. The data flow diagram illustrates multiple embodiments, wherein it is recognized these embodiments are illustrative in nature and not limiting in scope. In the example of FIG. 10, there are six exemplary environmental sensors 202: camera; motion; sound; wireless; heat; and electric field. Other examples of sensors include, but are not limited to: light sensor; infrared, ultrasonic, geospatial, and Internet sensors.

The environmental sensors 202 detect ambient conditions using the sensor technology. The data flow diagram of FIG. 10 shows multiple embodiments of the ambient conditions 204 relating to ambient condition factors 206. FIG. 10 illustrates exemplary ambient conditions 204: quantity of viewers; identity of viewers; viewer proximity; viewer motion; viewer mood; and ambient sounds. Other examples ambient conditions include, but are not limited to: viewer gestures; human sounds; musical sounds; light quantity; light source; light direction; local temperature; and geographic location.

Based on these ambient conditions 204, the data flows to one or more ambient condition factors 206, usable for the retrieval of visual display content. Ambient condition factors 206 include, but are not limited to: owner default; owner default interacting; two owner default; mixed owner default; mixed default small gathering; mixed default party active. Other examples include, but not limited to: default condition; owner mood positive; owner mood negative; two owners recognized song; mixed owner winter night in New York, etc.

The ambient condition factors 206 are then usable by the content selection algorithm 208 as noted in the data flow diagram.

One exemplary embodiment illustrated in FIG. 10 includes a motion sensor detecting four ambient conditions: (a) a quantity of viewers; (b) the identity of viewers; (c) proximity of viewers; and (d) the motion of viewers. The electric field sensor detects: (a) quantity of viewers; and (b)

the identity of viewers. The ambient conditions are then usable for the determination of the ambient condition factor, such as the ambient condition factor of "two owner default" is based on the ambient conditions of: (a) quantity of viewers; (b) identity of viewers; and (c) viewer proximity.

Figure 11:
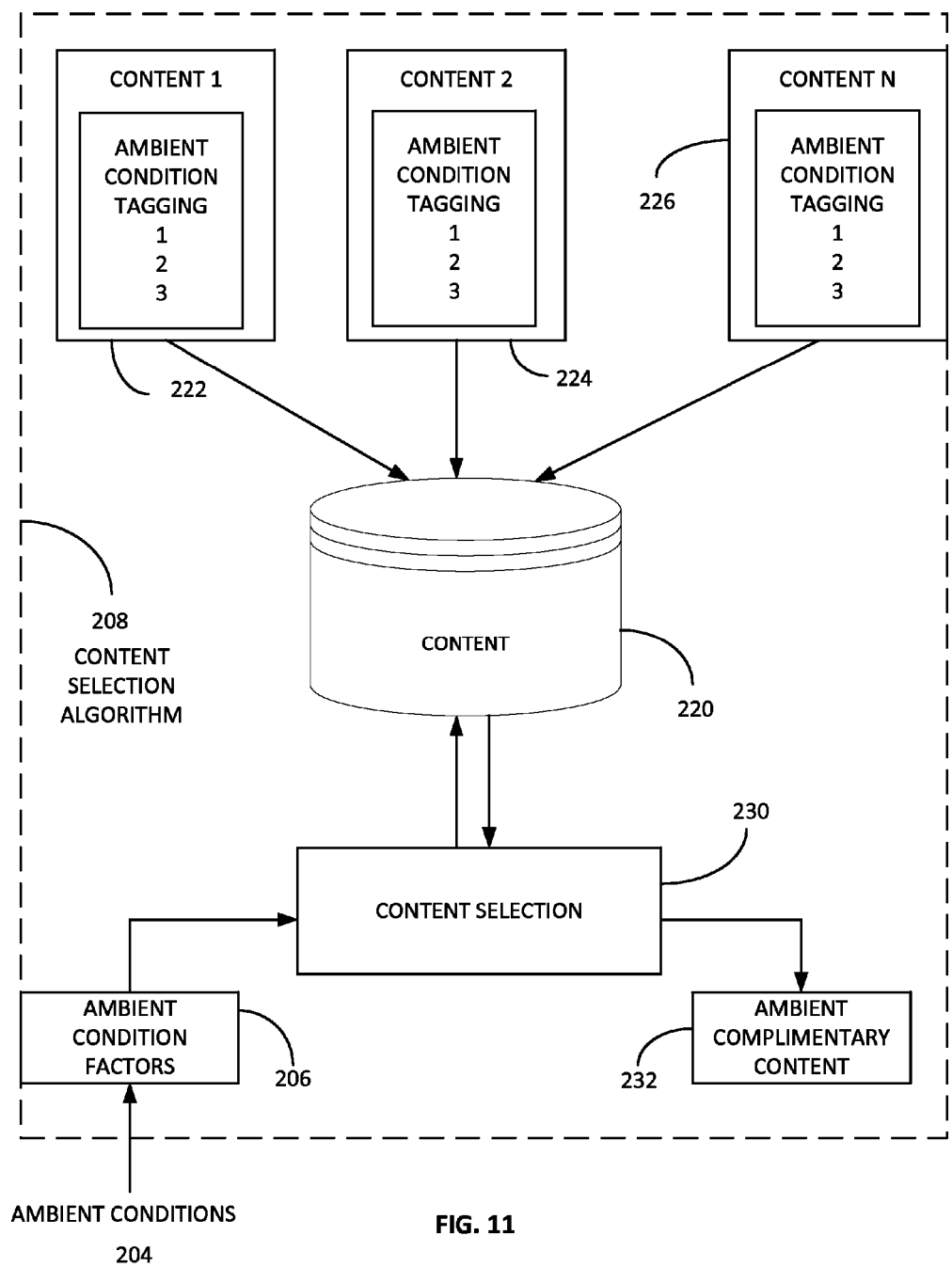
FIG. 11 illustrates a block diagram of one embodiment of a content selection algorithm.

FIG. 11 illustrates one embodiment of the content selection algorithm 208 of FIG. 10. The content selection algorithm operates with a content database 220, the content database including a plurality of content items 222, 224 and 226 by way of example. The content items can include audio and/or video output for display on the display device. For example, the content items may be images and music to compliment the ambient condition of the room as noted by the sensors.

The content itself includes tagging information usable for content selection. In this examples, content 1 222 includes ambient condition tagging 1, 2, and 3. The tags relate to the ambient conditions 206 of FIG. 5, such that the content 222 is usable for designated ambient condition factors. For example, content 1 222 may be designated usable for owner default, two owner default and mixed default small gathering.

A content selection operator 230 received ambient condition factors 206 that are based on the ambient conditions 204. The content selection operator 230 uses the factors 206 in coordination with the content database 220 to retrieve the appropriate content 222, 224 and/or 226. Once this content is received, the ambient complimentary content 232 is therein provided as an output to the display device noted above.

The system for intelligently receiving and displaying digital visual content has the capability to combine the information presented via one or more of the hardware sensors and software sources in any permutation and combination in order to present digital visual content in an environmentally optimized and relevant manner.

The system for intelligently receiving and displaying digital visual content presents digital visual content in an environmentally optimized and relevant manner. It creates a new platform for presenting images, videos, etc. based on external stimuli. It converts local physical and digital information in order to present a better device for artistic, decorative, informational, and other important purposes.

FIGS. 1 through 11 are conceptual illustrations allowing for an explanation of the present invention. Notably, the figures and examples above are not meant to limit the scope of the present invention to a single embodiment, as other embodiments are possible by way of interchange of some or all of the described or illustrated elements. Moreover, where certain elements of the present invention can be partially or fully implemented using known components, only those portions of such known components that are necessary for an understanding of the present invention are described, and detailed descriptions of other portions of such known components are omitted so as not to obscure the invention. In the present specification, an embodiment showing a singular component should not necessarily be limited to other embodiments including a plurality of the same component, and vice-versa, unless explicitly stated otherwise herein. Moreover, Applicant does not intend for any term in the specification or claims to be ascribed an uncommon or special meaning unless explicitly set forth as such. Further, the present invention encompasses present and future known equivalents to the known components referred to herein by way of illustration.

The foregoing description of the specific embodiments so fully reveals the general nature of the invention that others can, by applying knowledge within the skill of the relevant art(s) (including the contents of the documents cited and incorporated by reference herein), readily modify and/or adapt for various applications such specific embodiments, without undue experimentation, without departing from the general concept of the present invention. Such adaptations and modifications are therefore intended to be within the meaning and range of equivalents of the disclosed embodiments, based on the teaching and guidance presented herein.

The invention claimed is:

1. A method for generating an output display on a display device, the method comprising:
   accessing a content database external to the display device, the content database having a plurality of images stored therein;
   selecting at least one of the plurality of the images from the content database based on a user profile;
   downloading the at least one of the plurality of images to a local memory device associated with the display device;
   detecting an ambient condition using one of a plurality of environmental sensors;
   analyzing the ambient condition to determine ambient condition factors;
   detecting at least one connected computing device and a social media user profile associated therewith, the social media user profile relating to at least one social media network;
   referencing the at least one social media network using the social media user profile to detect character data;
   selecting at least one of the images from the local memory device using at least one of: the character data and the ambient condition factors; and
   generating the output display on the display device of the at least one selected images.

2. The method of claim 1, wherein the environmental sensor includes a light sensor for detecting a brightness level as an ambient condition and the visual display content reflects the bright level.

3. The method of claim 1, wherein the environmental sensor includes an audio sensor detecting ambient noise.

4. The method of claim 3 further comprising:
   providing an audio output via at least one audio device, the audio output based on the detected ambient noise.

5. The method of claim 4 further comprising:
   analyzing the ambient noise to detect at least one ambient condition;
   accessing an audio database having audio content stored therein and selecting audio content based the at least one ambient condition; and
   providing the audio content for the audio output.

6. The method of claim 1, wherein the environmental sensor includes a motion detector detecting motion about the display device, the method further comprising:
   detecting a commotion level external to the display device using the motion detector, the commotion level based on the ambient condition factors determined by the ambient conditions acquired by the environmental sensor; and
   selecting the at least one of the images from the local memory based on the commotion level.

7. The method of claim 1 further comprising:
   recognizing a person within a proximity to the display device using the environmental sensor;
   based on the recognition of the person, accessing an online data storage location having a plurality of images stored thereon;

retrieving at least one of the plurality of images from the online data storage location; and providing the at least one of the plurality of images as output on the display device.

8. The method of claim 1, wherein the content database is associated with a social media network and the at least one image is retrieved from the social media network.

9. The system of claim 1, wherein the environmental sensor is at least one of: a motion sensor and an electric field sensor.

10. The method of claim 1, wherein the content database is associated with a social media web location and the at least one image is retrieved from the social media web location.

11. A system for generating an output display on a display device, the system comprising:
- an environmental sensor operative to detect an ambient condition external to the display device;
- a content database external to the display device, the content database-having a plurality of images stored therein; and
- a processing device, in response to executable instructions, operative to:
  - acess the content database;
  - select at least one of the plurality of images stored in the content database based on a user profile;
  - download the at least one of the plurality of images to a local memory device associated with the display device;
  - detect the ambient condition using the environmental sensor;
  - analyze the ambient condition to determine ambient condition factors;
  - detect at least one connected computing device and a social media user profile associated therewith, the social media user profile relating to at least one social media network;
  - reference the at least one social media network using the social media user profile to detect character data; and
  - select at least one of the images from the local memory device using at least one of: the character data and the ambient condition factors; and
- the display device operative to provide the output display of the at least one selected image.

12. The system of claim 11, wherein the environmental sensor includes a light sensor for detecting a brightness level as an ambient condition and the visual display content reflects the bright level.

13. The system of claim 11, wherein the environmental sensor includes an audio sensor detecting ambient noise.

14. The system of claim 13 further comprising:
at least one audio device providing an audio output, the audio output based on the detected ambient noise.

15. The system of claim 14 further comprising:
the processing device further operative to analyze the ambient noise to detect at least one ambient condition; and an audio database having audio content stored therein, the processing device operative to access the audio database and select audio content based the at least one ambient condition.

16. The system of claim 11, wherein the environmental sensor includes a motion detector detecting motion about the display device, the system further comprising:
the motion detector detecting a commotion level external to the display device, the commotion level based on the ambient condition factors determined by the ambient conditions acquired by the environmental sensor; and
the processing device further operative to select the at least one of the images based on the commotion level.

17. The system of claim 11 further comprising:
at least one environmental sensor operative to recognize a person within a proximity to the display device; and
the processing device further operative to:
based on the recognition of the person, access an online data storage location having a plurality of images stored thereon;
retrieve at least one of the plurality of images from the online data storage location; and
provide the at least one of the plurality of images as output on the display device.

18. The method of claim 1, wherein the environmental sensor is at least one of: a motion sensor and an electric field sensor.

19. The system of claim 11, wherein the environmental sensor is at least one of: a motion sensor and an electric field sensor.

20. The system of claim 10, wherein one of the plurality of environmental sensors detects user gestures for providing gestrue-based control of the display device, the system further comprising:
the processing device further operative to detect:
using one of the plurality of environmental sensors, a user gesture external to the diplay device;and adjust the output display based on the user gesture.

* * * * *